United States Patent Office 3,564,371
Patented Feb. 16, 1971

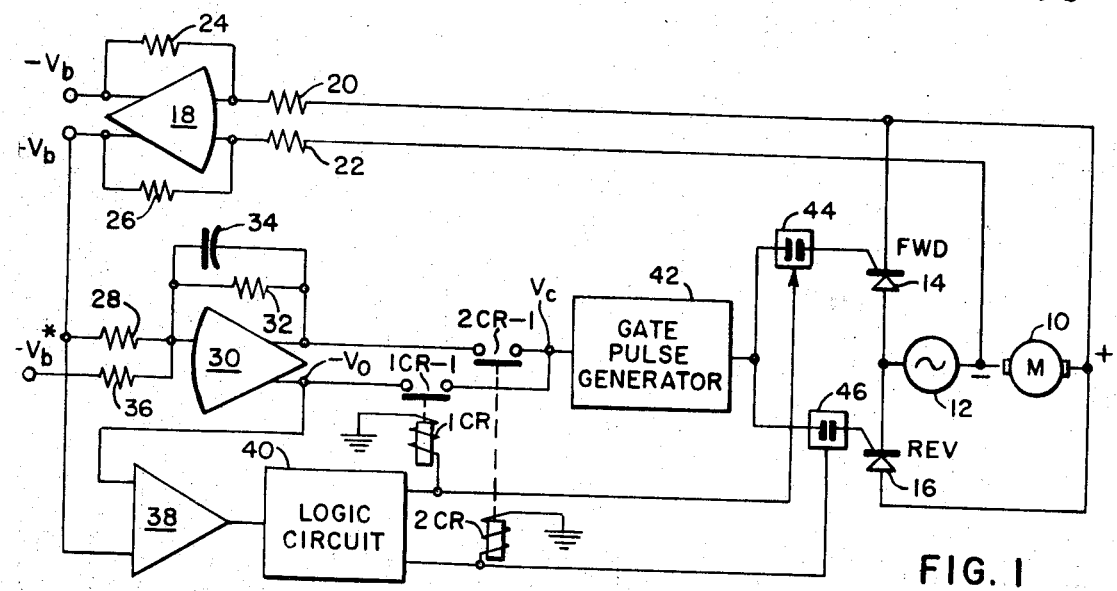
FIG. 1
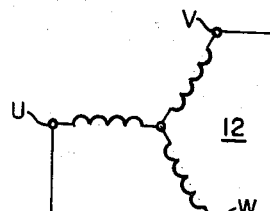
FIG. 2
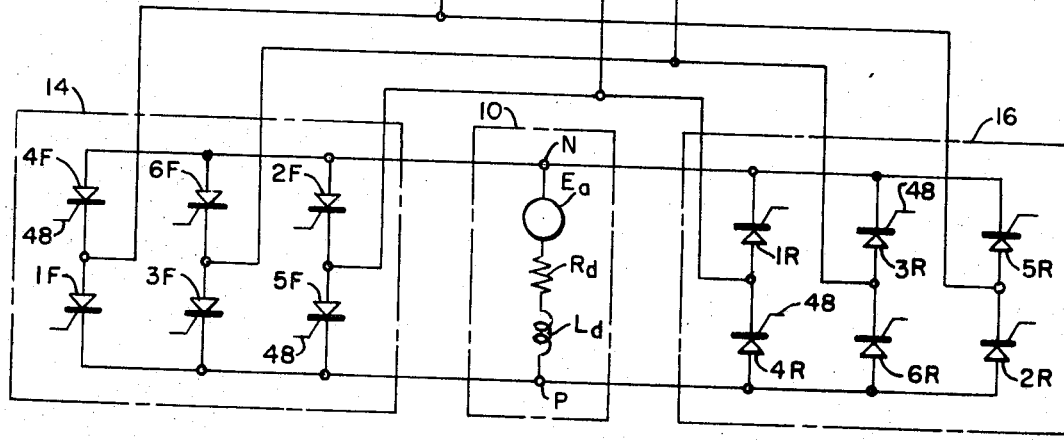

3,564,371
DUAL CONVERTER HAVING SHARED GATE
PULSE GENERATOR
Emil T. Schonholzer, 119 Lee St., Depew, N.Y. 14043
Filed Nov. 13, 1968, Ser. No. 775,358
Int. Cl. H02p 5/16
U.S. Cl. 318—345     6 Claims

ABSTRACT OF THE DISCLOSURE

An electrical motor drive which may be operated in the forward or reverse direction and which is supplied from a power unit having a first set of thyristors for supplying current in the forward direction and a second set of thyristors for supplying current in the reverse direction, and wherein a common gate pulse generator is selectively connected by a switching relay to the forward or reverse set of thyristors depending upon the direction of rotation desired. The switching relay, in turn, is controlled by a comparsion of the bus voltage from the motor with the output voltage of a voltage controller for the motor. In this manner, the deadband between the forward and reverse conduction modes is minimized.

CROSS-REFERENCES TO RELATED APPLICATIONS

Application Ser. No. 615,804, filed Feb. 13, 1967, and assigned to the assignee of the present application, now U.S. Pat. No. 3,487,279, issued Dec. 30, 1969.

BACKGROUND OF THE INVENTION

As is known, a thyristor power converter is an apparatus which, by means of phase-controlled gating thyristors or other controlled rectifier cells, converts an alternating current supply line voltage into an adjustable direct current voltage, this process being known as rectifying. Inversely, a direct current voltage can be converted back into an alternating current voltage; and this mode of operation is called inverting.

A single converter of the type described above is a unidirectional current source. If bi-directional current is required, a second converter can be added and connected to the first one back-to-back, thus forming a bi-directional or dual converter. Only one converter channel of the dual converter need be gated at any one time. Thus, one gate control system can be used on a time-shared basis for the two converters. However, this requires a logic system to determine whether the forward or reverse converter should be gated at a particular time.

In the past, time-shared gate control systems have been provided wherein switching from the forward to reverse converter or vice versa is controlled by a signal from a current controller for the motor. Typically, the primary power for the motor is supplied from a polyphase converter supply and the current signal is derived through current transformers from the buses of the supply. Complex logic networks are required to determine from the magnitude and polarity of this current signal what command signal should be transmitted to the gate pulse generator. It has also been realized that the reliability of such current controlled apparatus is adversely affected by the difficulty of determining at what point the current signal is of zero magnitude. This difficulty is encountered more in drives in which the motor is regulated and controlled through its field than in drives in which the regulation and control is effected through the armature. In armature control, the ripple and the current flow may serve at least to a limited extent as a criterion for determining when the current through the armature is at a low magnitude. But in the case of field control, the ripple is not present or is of such low magnitude as not to be usable to serve as a criterion.

In an effort to overcome the disadvantages of current-controlled, time-shared converters, apparatus such as that shown in copending application Ser. No. 615,804, filed Feb. 13, 1967, now U.S. Pat. No. 3,487,279, has been provided wherein the output voltage of the voltage controller for the motor is processed, usually with a current feedback signal, in a reversing logic circuit to determine which one of the converters should be gated. When the output voltage of the voltage controller is used alone as a control parameter, however, a relatively wide spacing or deadband area between the forward and reverse transfer operating curves for the dual converter is required.

SUMMARY OF THE INVENTION

As an overall object, the present invention seeks to provide a control system for a reversible, thyristor powered electrical motor employing a common gate pulse generator, wherein the deadband between the forward and reverse operating modes is reduced.

More specifically, an object of the invention is to provide a motor control system of the type described wherein a common gate pulse generator is controlled by comparison of an output error signal from the voltage controller for the motor with an operation signal signaling the actual voltage across the motor.

In accordance with the invention, a dual converter is connected in energizing relationship with a motor, the converter including forward controllable valve means for energizing the motor to rotate in a forward direction and reverse controllable valve means for energizing the motor to rotate in the reverse direction. Common gating means are connected to both of the valve means for selectively controlling one or the other of the valve means depending upon the setting of the gating means. Regulating means are connected in regulating relationship with the motor and include a voltage controller responsive to a reference signal and an actuator motor voltage signal to produce an output error signal for controlling the motor.

The present invention resides in the realization that this error signal can be compared with the actual voltage signal from the motor; and when this comparison indicates that the motor is operating intermediate the forward and reverse operating control characteristics, the gate pulse generator is caused to switch from one operating mode to the other. As will be seen, this facilitates a closer spacing of the transfer curves than was possible with prior art systems which utilized the output error signal from the voltage controller alone.

The above and other objects and features of the invention will become apparent from the following detailed description taken in connection with the accompanying drawings which form a part of this specification, and in which:

FIG. 1 is a schematic illustration showing the main control elements of the present invention;

FIG. 2 is a schematic circuit diagram of a dual converter of the type utilized in the present invention;

Figure 3:
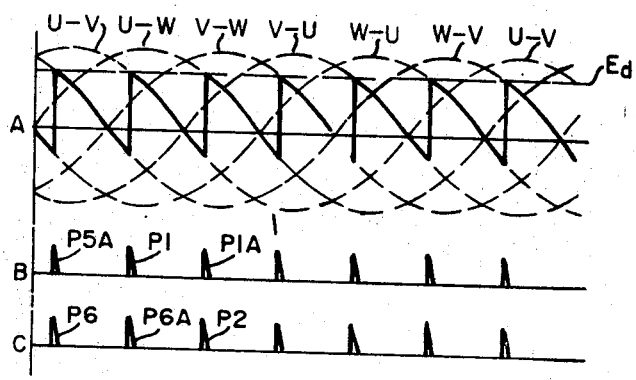
Figure 4A:
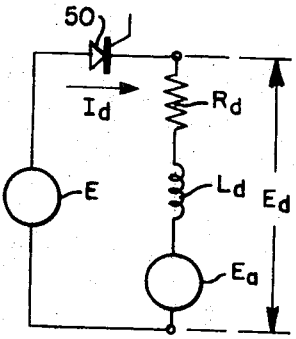
Figure 4B:
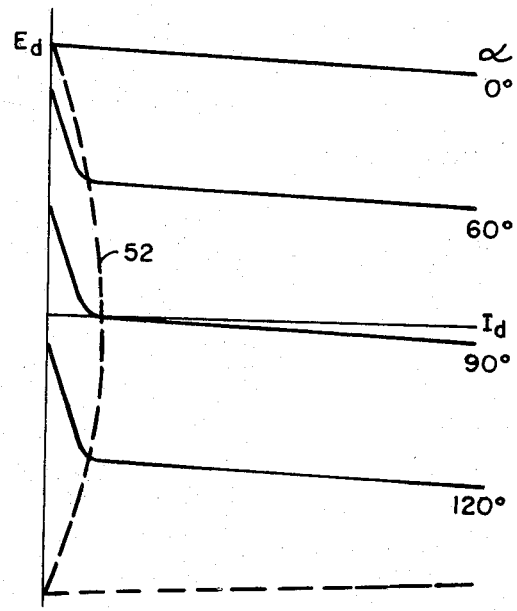
Figure 4C:
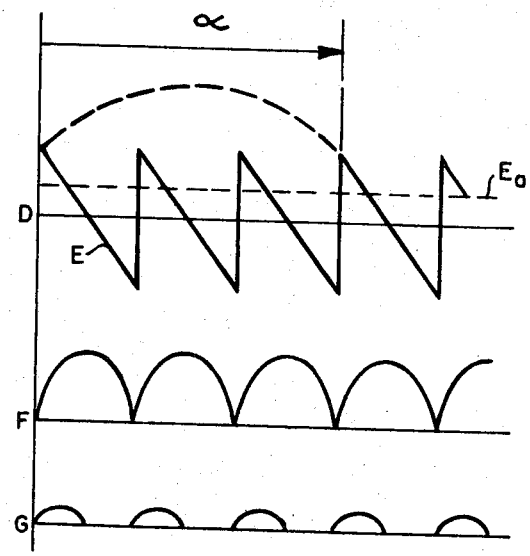
Figure 5:
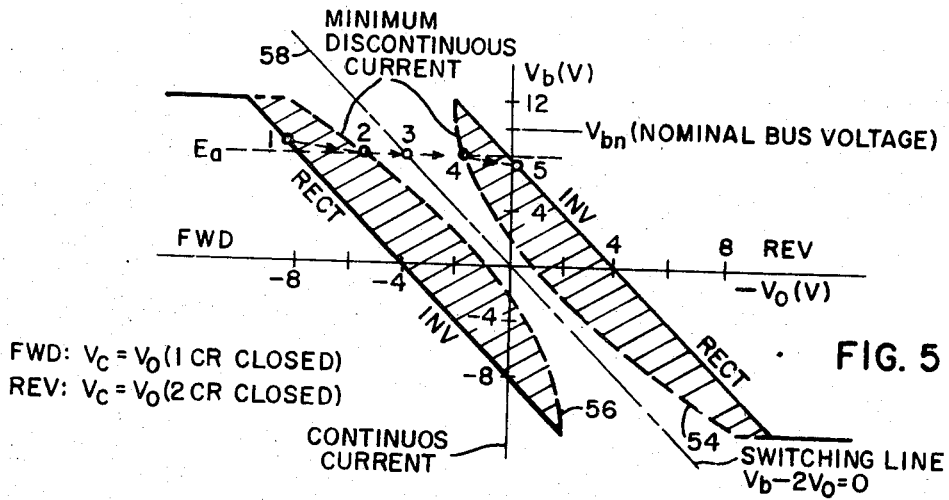
Figure 6:
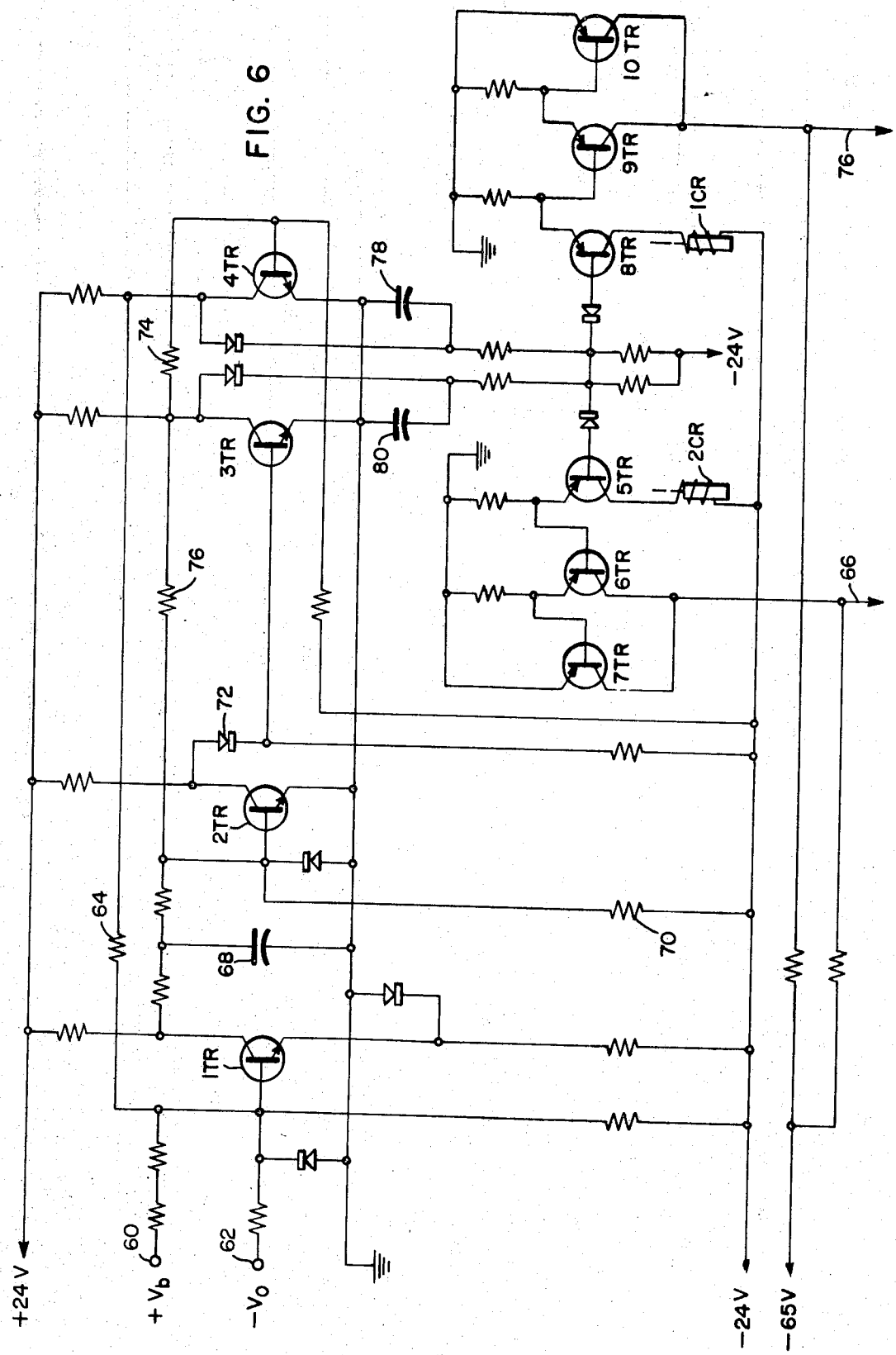

FIG. 3 comprises waveforms illustrating the operation of the dual converter of FIG. 2;

FIG. 4A is an equivalent circuit diagram for one of the converters utilized in the invention;

FIGS. 4B and 4C comprise graphs illustrating the characteristics of the converter operation when coupled to a direct current motor;

FIG. 5 is a graph illustrating the characteristics of the dual converter controller of the present invention; and FIG. 6 is a schematic circuit illustration of the reversing logic network of the invention.

With reference now to the drawings, and particularly to FIG. 1, a motor 10 is shown connected to a source of alternating current supply voltage 12 through a dual converter, schematically illustrated by forward and reverse thyristor elements 14 and 16. As will be seen, the thyristor element 14, in the usual three-phase alternating current supply system, represents six separate thyristors which are fired during the forward mode of operation of the motor 10. Similarly, the thyristor element 16 represents six separate thyristors which are operative during the reverse mode of operation of the motor.

In the usual motor control system, the speed of the motor is controlled and regulated by feedback loops which are connected to control the power which the thyristors supply to the motor. In a typical case, there are three such loops. An outermost speed loop regulates in response to feedback from the motor supplied through a tachometer generator or other motor-speed responsive device; an intermediate current loop regulates responsive to the feedback supplied through current transformers which transmit a signal proportional to the current supplied to the motor; and an innermost voltage loop regulates responsive to feedback dependent on the voltage directly controlling the motor, for example, the net armature voltage of the motor.

In the schematic illustration given in FIG. 1, only the innermost voltage loop is shown. It includes a voltage sensor 18 having two inputs, one of which is connected through resistor 20 to the positive terminal of the motor 10 and the other of which is connected through resistor 22 to the negative terminal of the same motor 10. The voltage sensor 18 is provided with feedback resistors 24 and 26 and will produce voltages $-V_b$ and $+V_b$ on its output terminals, these voltages being indirectly proportional and directly proportional, respectively, to the actual voltage across the motor. The voltage $+V_b$ is applied through resistor 28 to one input of a voltage controller 30 which is a differential output amplifier having a feedback path including a resistor 32 and capacitor 34 in parallel. Also applied to the input of the voltage controller through resistor 36 is a reference voltage $-V_b^*$ which represents the desired armature voltage of the motor as determined by an operator or other control parameter.

As mentioned above, the bus voltage from the motor is picked up by the voltage sensor 18 and brought to one input of the voltage controller 30. Here it is compared with the reference voltage $-V_b^*$ applied at the second input. Depending upon the polarity of the difference of the two voltages, the output error voltage $-V_0$ from the voltage controller 30 will swing negative or positive. By comparing this output voltage $-V_0$ with the bus voltage $+V_b$ in circuit 38, the polarity of converter conduction can be determined, as will be explained more fully hereinafter. For example, if the bus voltage $+V_b$ is smaller than the reference signal $V_b^*$, forward load current conduction is indicated and, therefore, the forward channel of the dual converter should be pulsed. Under these conditions, $-V_0$ is negative, and compared with $V_b$ at the input of the differential amplifier 38 will result in its output actuating logic circuit 40 to pick up relay 1CR, thereby closing contacts 1CR-1. At the same time, the logic circuit 40 connects the gate pulse generator 42, responsive to the error signal $-V_0$, to the forward thyristors 14 of the dual converter through switch 44.

Now, if the reference voltage $V_b^*$ is suddenly reduced to demand reverse current, the opposite sequence of events will take place. That is, the bus voltage $V_b$ will be greater than the reference signal $V_b^*$; and comparison of the error signal $-V_0$ with $V_b$ at the input of amplifier 38 will result in energization of relay 2CR and closing of contact 2CR-1 and switch 46 whereby the reverse thyristors 16 are now pulsed by the gate pulse generator 42.

Further details of the entire system may be had by reference to the aforesaid U.S. Pat. No. 3,487,279.

With reference now to FIG. 2, the dual converter, represented by the single thyristors 14 and 16 in FIG. 1, is shown. In this case, the source of alternating current voltage 12 is identified as three windings or phases connected in a Y-configuration and having terminals U, V and W. The forward thyristors 14 comprise six in number and are identified as 1F through 6F. Similarly, the reverse thyristors are identified by the reference numerals 1R through 6R. The motor 10 is represented as a counter-electromotive force $E_a$, a load resistance $R_d$ and a load impedance $L_d$. Missing, of course, is the specific gate pulse generator 42 which is connected to each of the gate electrodes 48 of the thyristors. The gate pulse generator may take various forms well known to those skilled in the art and need not be described here in detail. However, for a specific type of gate pulse generator, reference may again be had to the aforesaid U.S. Pat. No. 3,487,279.

The operation of the dual converter of FIG. 2 can best be understood by reference to the waveforms of FIG. 3. The uppermost traces U–V, U–W, V–W, etc. (waveform A) show the secondary line voltages, measured from the first terminal letter of the source 12 to the second terminal letter. Initially, all thyristors are assumed to be in the blocking state. At a phase angle of 15°, pulses P6 and P5A in waveforms B and C are simultaneously applied to the gates of thyristors 6F and 5F, for example. Both of these cells become conductive and a path exists from terminal W to terminal P through the load 10 to N and then to V. Thus, the line voltage W–V is applied to the load. However, 60° later, at a phase angle of 75°, gate pulses P1 and P6A are applied to cells 1F and 6F. Cell 6F is already conducting. Cell 1F is now turned ON and the load current will commutate from cell 5F to cell 1F since the voltage U–V is larger than the voltage W–V at this instant. Again, 60° later, cells 2F and 1F are gated by pulses P2 and P1A and a similar commutation will take place on the even numbered (i.e., negative) side of the bridge circuit.

Assuming that the load is substantially inductive, such as a motor, the direct current will reach a steady value after a number of cycles, and each thyristor will then conduct a 120° wide current block each cycle. The operation of the reverse thyristors 1R through 6R is, of course, identical to that of the forward thyristors when switch 46 is closed rather than switch 44.

In a practical circuit such as is commonly found with direct current motor armatures as a load, the actual converter operation always covers the range of discontinuous current at light load levels also. Reducing the load current, one finally reaches a level where the ripple amplitude is high enough to interrupt the current cyclically. At this transition point, the regulation characteristic takes a sharp break and aims to a point equal to the peak converter voltage $E_d$ (FIG. 3) at zero load current. This transition point depends upon the gating angle, the inductance and the losses in the load circuit.

The manner in which discontinuous current through the motor occurs is shown in FIGS. 4A, 4B and 4C. FIG. 4A is an equivalent circuit diagram wherein a thyristor is indicated by the reference numeral 50. This is connected in series with a source of alternating current potential E and a motor represented as a counter-electromotive force $E_a$, a resistance $R_d$ and an inductance $L_d$.

In FIG. 4B, the load characteristics of the motor are shown for various firing angles. Note that the voltage $E_d$ across the motor remains essentially constant for all firing angles until the current $I_d$ approaches zero. At this point, there is a sharp transition, the voltage $E_d$ increasing sharply. Furthermore, the load transition points vary from minimum at zero degrees to a maximum at 90° and then to a minimum at 180°, thereby producing a curve 52 within which discontinuous current conditions occur.

In FIG. 4C, waveform D, the counter-electromotive force of the load is represented by the broken line $E_a$. Assuming that the average value of the applied voltage E is greater than the counter-electromotive force $E_a$, the current (waveform F) will be continuous. However, with the average value of the converter output voltage E just matching the counter-electromotive force $E_a$ of the motor, and at lower values, the current becomes discontinuous as shown in waveform G. It is for this reason that it is difficult to initiate switching of the gate pulse generator reliably as a function of load current. That is, switching might occur during discontinuous current operations when, in fact, it should not occur. Furthermore, as was explained above, switching the gate pulse generator when the output error signal $-V_0$ from the speed controller 30 reaches zero requires a rather wide spacing of the forward and reverse transfer curves for the dual converter.

In accordance with the present invention, therefore, the output error signal $-V_0$ from the speed controller 30 is compared with the bus voltage $+V_b$ to derive an error signal which produces the control characteristic shown in FIG. 5 where the output voltage of the power converter as a function of the input voltage to the gate pulse generator is illustrated for conditions of continuous current and minimal discontinuous or pulsing current. The shaded area represents the field of various possible states of discontinuous current conduction.

As was mentioned above, the case of minimal discontinuous current is of main interest for armature loads. It represents the case for a gating angle adjustment where the peaks of the converter output voltage are just matching the counter-electromotive force of the motor. For any higher gating angle no current conduction can set in any more. This then means that no current flow can continue in the area past the minimum discontinuous current line (i.e., line 54 or 56). Shifting into this area indicates that current of the opposite polarity is required. However, to simplify the sensing of this condition and to add some safety margin, actual switching is initiated when the indicated switching line 58 is crossed. Note that this switching line is straight and is achieved by a comparison of the two signals $+V_b$ and $-V_0$.

With the converter initially in the forward conduction mode, a reversal shall now be described. The counter-electromotive force $E_a$ of the load is assumed to be as shown in FIG. 5 with the forward converter rectifying at point 1. The relay 1CR is picked up and the forward gate pulse distribution switch 44 is closed. Suddenly, the reference voltage $-V_b^*$ is lowered to a value below $E_a$, demanding a current reversal. This will cause the voltage controller output voltage $-V_0$ to advance toward positive values. At point 2, the forward current will stop altogether; and at point 3, the reversing logic sequence will be initiated. Relay 1CR will drop out and the forward pulse switch will open. Dropping out of relay 1CR and the voltage controller results in the voltage $V_c$ at the input to pulse generator 42 assuming a value large enough to phase out pulsing in the gate pulse generator. About 3 milliseconds later, relay 2CR picks up and the reverse pulse switch closes, making the reverse converter ready for control.

Closing contacts 2CR–1 has the effect of picking up the signal $V_c$ at the output of the controller 30 which is equal to $V_0$. Now the transfer curves for the reverse converter in FIG. 5 apply. The transfer of the voltage $V_c$ from $-V_0$ to $V_0$ is equivalent to a reversal of the feedback polarity, which is required to compensate for a similar reversal in the power converter. The voltage $-V_0$ continues toward positive values, and at point 4, the reverse converter starts to pick up current operating in the inverting mode. Finally, at point 5, the new quiescent state of reverse conduction has been reached where $V_b$ is again matching the reference $V_b^*$. The opposite sequence of events, of course, takes place in the case of a change from reverse to forward current.

The amplifier 38 and the logic circuit 40 may take various forms well known to those skilled in the art; its essential function being to compare the voltages $V_b$ and $-V_0$ and to produce an output signal for reversing the relays 1CR and 2CR and the switches 44 and 46 when a comparison of the two voltages indicates that the switching line 58 of FIG. 5 has been reached.

One type of amplifier and reversing logic network which may be used in accordance with the present invention is shown in FIG. 6. The voltage $+V_b$ is applied to input terminal 60 while the voltage $-V_0$ at the output of the controller 30 is applied to input terminal 62. Transistors TR1 through TR4 utilized in the circuit of FIG. 6 are of the NPN type while the remainder are PNP transistors.

The voltage $+V_b$ on terminal 60 is compared with the output signal of the voltage controller $-V_0$, and a bias voltage applied through resistor 64 to produce a voltage on the base of transistor 1TR which either turns it ON or turns it OFF. Initially, it will be assumed that transistors 1TR, 3TR, 5TR, 6TR and 7TR are ON. With transistor 5TR ON, relay 2CR is energized, thereby closing contacts 2CR–1 in FIG. 1. At the same time, a voltage is produced at terminal 66 which causes the gate pulse generator 42 to fire the reverse thyristors 16. The manner in which this is accomplished may be understood by reference to the aforesaid U.S. Pat. No. 3,487,279. Now, if the input signals $V_b$ and $-V_0$ are changed such that a negative bias is applied to the base of transistor 1TR, the transistor 1TR turns OFF and its collector swings positive. Approximately 1 millisecond later, the voltage on capacitor 68 has changed sufficiently to overcome the negative bias applied to the base of transistor 2TR through resistor 70. Consequently, transistor 2TR turns ON and the voltage on its collector rises in the negative direction, thereby blocking diode 72. This, in turn, raises the negative potential on the base of transistor 3TR, causing it to turn OFF.

The rise in potential on the collector of transistor 3TR, applied to the base of transistor 4TR through resistor 74, causes the transistor 4TR to turn ON. This, in turn, applies a negative bias to the bases of transistors 8TR, 9TR and 10TR, causing relay 1CR to be energized and a potential to appear at terminal 76 which causes pulses to be applied to the forward thyristors from the gate pulse generator 42. When transistor 4TR turns ON, it changes the feedback signals through resistors 64 and 76 to transistors 1TR and 2TR. These feedback signals produce a desired hysteresis into these switching loops.

It should be noted that when transistor 3TR turns OFF, transistors 5TR, 6TR and 7TR are turned OFF immediately; however because of capacitor 78 (capacitor 80 in the case of transistor 3TR) the transistors 8TR, 9TR and 10TR are not turned ON until a time delay of about 2 microseconds. A complementary sequence takes place if the signals at the input are changed in the opposite direction.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In combination, an electrical motor, a dual converter connected in energizing relationship with said motor, said converter including forward controllable valve means for energizing said motor to rotate in a forward direction and reverse controllable valve means for energizing said motor to rotate in the reverse direction, common gating means connected to both of said valve means for selectively controlling one or the other of said valve means in dependence upon the setting of said gating means, regulating means connected in regulating relationship with said motor and including a voltage controller, means connected to an input terminal of said voltage controller for impressing thereon a reference signal signaling the desired operation of said motor, means connected to an input terminal of said voltage controller for impressing thereon an operation signal signaling the actual voltage across said motor, the voltage controller acting to compare said operation signal and said reference signal to produce an error signal, and means connected to the output of said voltage controller and to an input terminal of said voltage controller and responsive to said error signal at the output of said voltage controller and said operation signal at the input of said voltage controller for actuating said gating means to cause one or the other of the valve means to energize said motor.

2. The combination of claim 1 wherein said means for actuating said gating means comprises first and second switch means, the first of said switch means connecting the output of said voltage controller to said common gating means and the output of said common gating means to said forward controllable valve means, and the other switch means acting to connect the output of said voltage controller to said common gating means and the output of said common gating means to said reverse controllable valve means.

3. The combination of claim 1 wherein said controllable valve means comprise semiconductive controlled rectifiers.

4. The apparatus of claim 1 wherein the regulating means includes a voltage loop, said voltage loop including said voltage controller.

5. The combination of claim 1 wherein the means responsive to said error signal and said operation signal compares said last-named signals to produce an output signal for controlling said gating means.

6. The combination of claim 5 wherein said gating means switches from one valve means to the other when said output signal is zero.

References Cited
UNITED STATES PATENTS

| | | | |
|---|---|---|---|
| 3,293,522 | 12/1966 | Lewis | 318—327 |
| 3,378,739 | 4/1968 | Livengood | 318—20.821 |
| 3,393,354 | 7/1968 | Gaither | 318—341 |
| 3,411,063 | 11/1968 | Schoonover | 318—331 |
| 3,428,880 | 2/1969 | Muller | 318—257 |
| 3,453,523 | 7/1969 | Fair | 318—331 |
| 3,487,279 | 12/1969 | Stringer | 318—257 |

ORIS L. RADER, Primary Examiner

T. LANGER, Assistant Examiner

U.S. Cl. X.R.

318—331